(12) United States Patent
Bibeau

(10) Patent No.: US 6,474,975 B2
(45) Date of Patent: Nov. 5, 2002

(54) PRESS MECHANISM

(75) Inventor: Ron Bibeau, Elkhart, IN (US)

(73) Assignee: Coachmen Industries, Inc., Elkhart, IN (US)

( * ) Notice: Subject to any disclaimer, the term of this patent is extended or adjusted under 35 U.S.C. 154(b) by 0 days.

(21) Appl. No.: 09/267,965

(22) Filed: Mar. 12, 1999

(65) Prior Publication Data

US 2002/0056943 A1 May 16, 2002

Related U.S. Application Data

(60) Provisional application No. 60/079,606, filed on Mar. 27, 1998.

(51) Int. Cl.$^7$ .............................................. B29C 51/18
(52) U.S. Cl. .............................. 425/383; 425/DIG. 48; 425/388; 264/554; 264/292
(58) Field of Search ................................ 264/554, 292, 264/291, 294; 425/DIG. 48, 388, 387.1, 112, 383; 156/285, 475, 492

(56) References Cited

U.S. PATENT DOCUMENTS

| | | | | | |
|---|---|---|---|---|---|
| 3,655,320 A | * | 4/1972 | Heavener | ..................... | 425/388 |
| 4,744,848 A | * | 5/1988 | Andrews et al. | ............. | 156/224 |
| 4,938,678 A | * | 7/1990 | Oulman | ........................ | 425/397 |
| 4,975,236 A | * | 12/1990 | MacLachlan | ................ | 264/553 |
| 5,863,568 A | * | 1/1999 | Tomita et al. | ............... | 425/185 |
| 6,063,326 A | * | 5/2000 | Kotha et al. | ................. | 264/547 |

* cited by examiner

Primary Examiner—Jan H. Silbaugh
Assistant Examiner—Edmund H. Lee
(74) Attorney, Agent, or Firm—Price, Heneveld, Cooper, DeWitt & Litton

(57) ABSTRACT

Method and apparatus of forming articles includes a press having a pair of opposite platens. An articulated clamping frame is mounted between the platens, each of which are moveable toward and away from the clamping frame. Material to be formed is clamped into the clamping frames and the articulated clamping frame is wrapped around the die as the die forms the material. The formed article is extracted from the die by moving the clamping frame away from the die.

7 Claims, 11 Drawing Sheets

PRESS MECHANISM

This application claims the benefit of U.S. Provisional Application No. 60/079,606, filed Mar. 27, 1998.

This invention relates to a method and apparatus for forming large articles having curved surfaces from plastic sheet material.

Vacuum forming methods for forming large articles having curved surfaces from sheets of vinyl or plastic material are well known in the art. These processes are commonly used to form large automotive body members, such as bumper facia, and may also be used to form tank halves and similar articles. According to a known process, a plastic sheet is mounted in a clamping frame, heated, and then formed by forcing a die into the sheet and then sucking the sheet against the die by use of vacuum. The product is then cooled, the die extracted, and the finished product removed from the clamping frame. This and similar processes have been widely used to manufacture such articles at a relatively low cost.

However, prior art processes, depending upon the shape and complexity of the article being formed, require larger sheets than would otherwise be necessary to accommodate stretching as the mold enters the sheet. Accordingly, the thickness of the product cannot be easily controlled, and "chills" and other defects in the product are common. Furthermore, dies must be carefully designed when complex shapes are formed to avoid die locks in which it is impossible to remove the die from the finished part. According to the present invention, the plastic sheet is mounted in an articulated frame that is wrapped around the mold as the mold enters the sheet. Accordingly, material savings of one-third or more can be realized by using smaller sheets than are required in the prior art processes. Because the sheet is wrapped around the mold as the mold enters the sheet, better quality formed products are realized, without chills and other defects in the product, and die locks are more easily avoided.

These and other advantages of the present invention will become apparent from the following description, with reference to accompanying drawings, in which.

Figure 1:
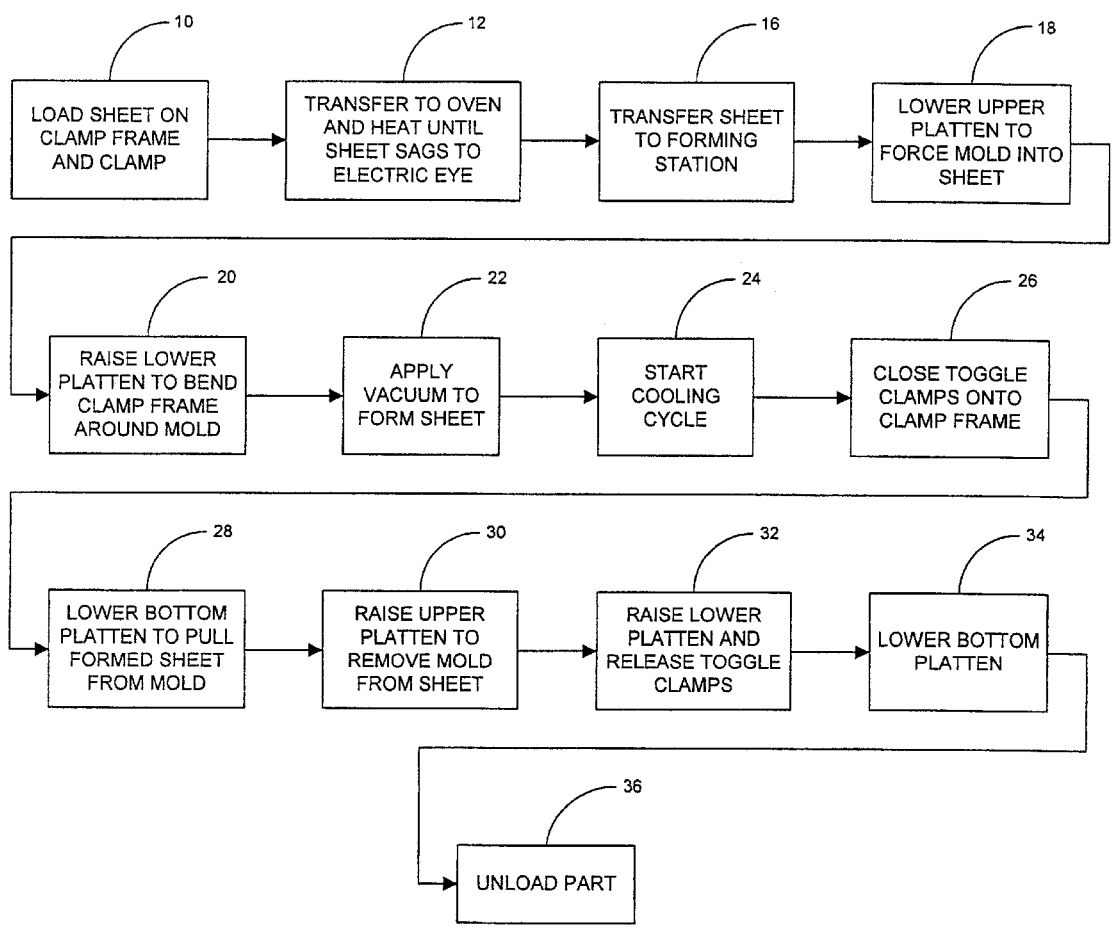
FIG. 1 is a flow chart describing the process according to the present invention.
Figure 5:
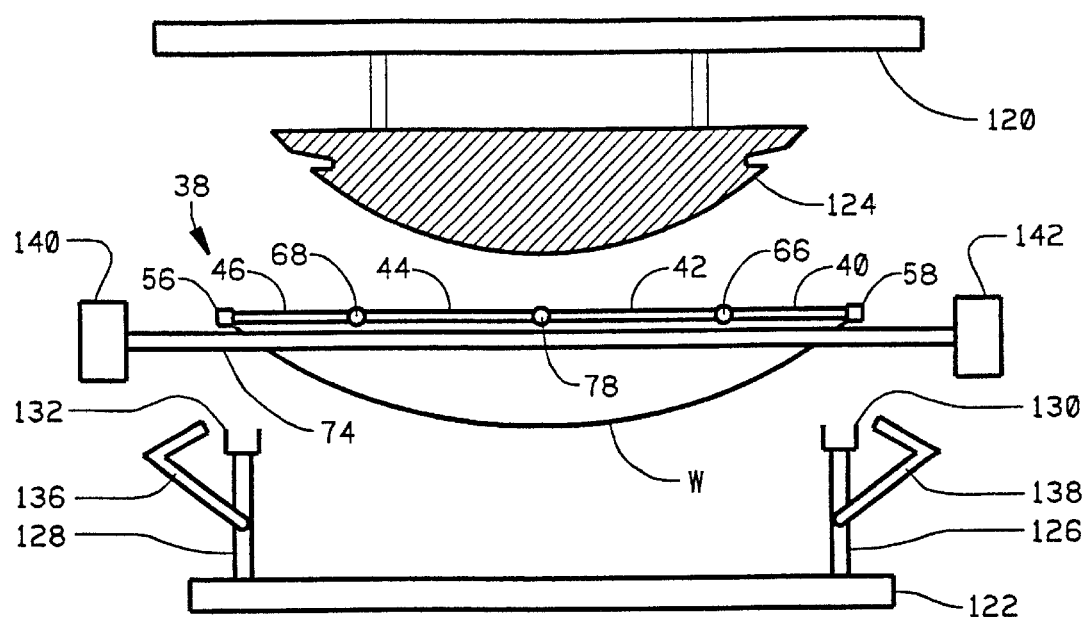
FIG. 5 is a schematic elevational view, with the die illustrated in cross-section, of the apparatus used in the present invention positioned to perform an initial step of the molding process of the present invention.
Figure 6:
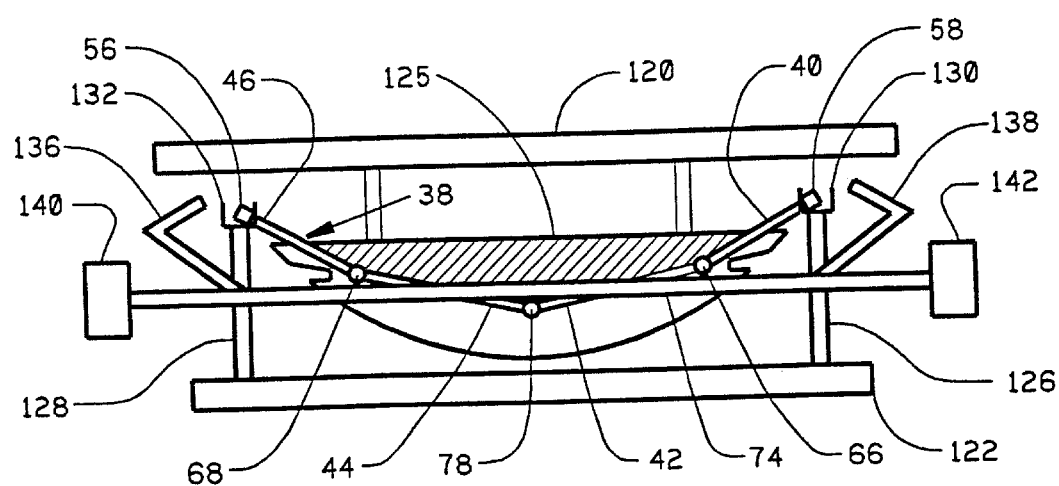
FIGS. 6–11 are views similar to FIG. 5 but illustrating additional steps in the process according to the present invention.

Referring now to FIG. 1, a commercially available plastic or vinyl sheet of a size sufficient to be vacuum molded into the desired component is loaded onto a clamping frame and clamped to the frame as indicated at 10 in FIG. 1. Loading of the sheet on the frame may be effected by a conventional sheet loader onto which the sheet is placed and which then elevates the sheet so that it may be clamped on the clamp frame. The frame is then transferred to an oven, as indicated at 12, and heated until the sheet sags below the frame a distance sufficient to actuate an electric eye, all as well known in the prior art. After the sheet is heated, it is transferred to the forming station, as indicated at 16 on FIG. 1 and as illustrated in FIG. 5. The upper platen of the press, which carries the vacuum forming die, is then forced into the sheet, as indicated at 18 in FIG. 1, and the lower platen is raised to bend the clamping frame about the mold carried on the upper platen, as indicated at 20 in FIG. 1, and also as illustrated in FIG. 6. A vacuum is then pulled through the die to form the sheet around the die, as indicated at 22. A cooling cycle is then initiated, as indicated at 24. The cooling cycle may, for example, include the circulation of ambient air around the product to cool the product until the product becomes rigid. Toggle clamps on the lower platen are then closed onto the clamp frame as indicated at 26 in FIG. 1 and in FIG. 7. The lower platen is then lowered, as indicated at 28 and in FIG. 8, to pull the formed sheet away from the mold. The upper platen is then raised to remove the mold from the formed article as indicated at 30 in FIG. 1 and as also illustrated FIG. 9. The lower platen is then raised and the toggle clamps are released, as indicated at 32 in FIG. 1 and in FIG. 10. The lower platen is then fully lowered, as indicated at 34 in FIG. 1 and in FIG. 11. The part is then unloaded as indicated at 36 in FIG. 1, by raising a conventional unloader to support the part and then releasing the clamps and then lowering the completed component out of the forming station.

Figure 2:
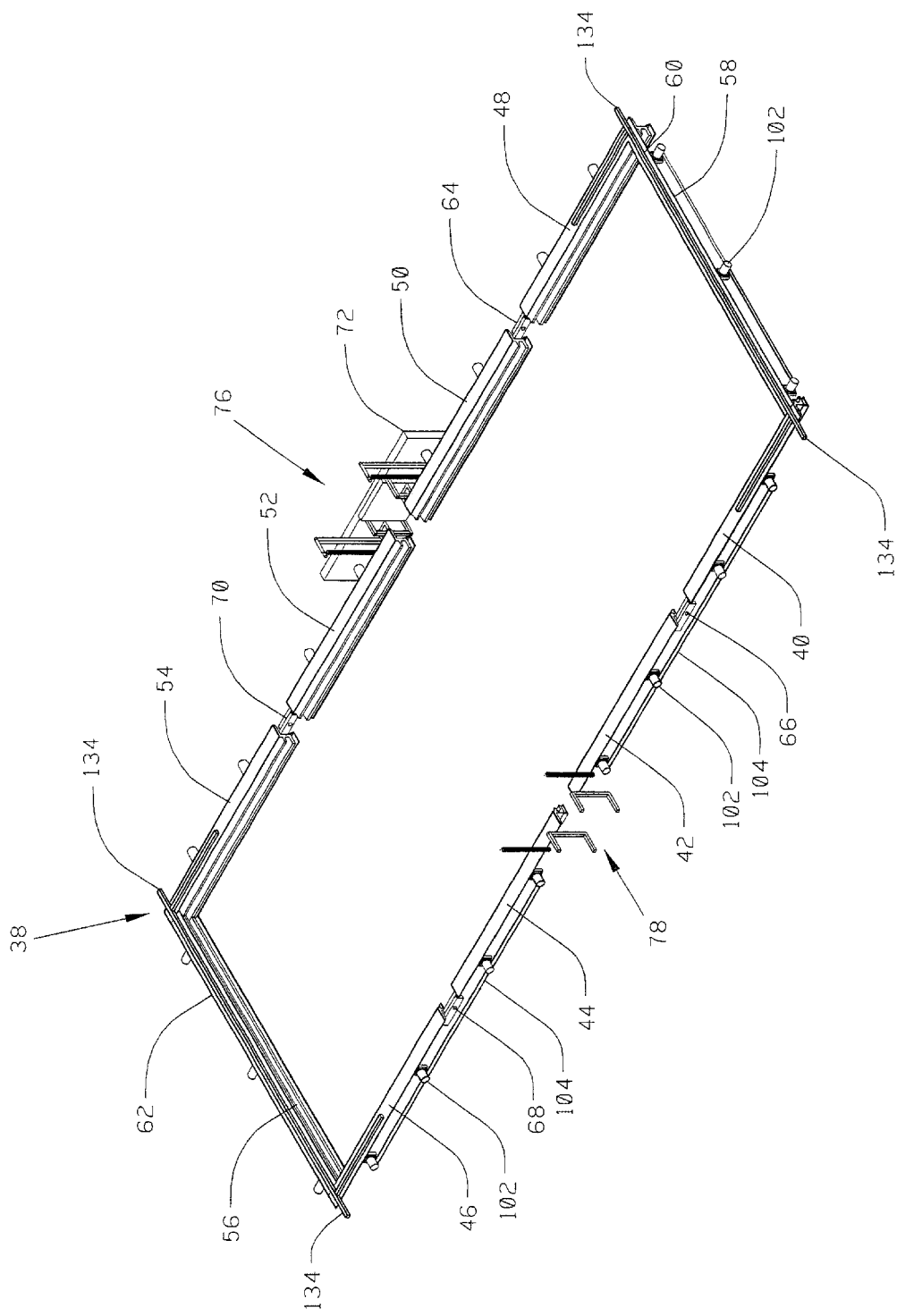
FIG. 2 is a view in perspective of the clamping frame used in the present invention.

Referring now to FIG. 2, a clamping frame used in the present invention is generally indicated by the numeral 38. Clamping frame 38 includes side clamps 40, 42, 44 and 46 extending along one side of the frame, and corresponding clamps 48, 50 52 and 54 extending along the other side of the frame. The frame 38 includes opposite end clamps 56, 58. The side clamps 40 and 48 are tied to the end clamp 58 for movement therewith by bar assembly 60. Similarly, the clamps 46 and 54 are tied to the end clamp 56 by bar assembly 62 at the end of the frame 38 opposite the bar assembly 60. Clamp 48 is pivotally attached to clamp 50 through pivot connector 64; clamp 40 is pivotally connected to clamp 42 by a pivot connector 66; clamp 44 is pivotally connected to clamp 46 by a pivot connector 68; and clamp 52 is connected to clamp 54 through a pivot connector 70. The pivot connectors 70, 64 are attached to a side rail extending substantially parallel to the clamps 48, 50, 52 and 54, a portion of which is shown at 72 in FIG. 2. The pivot connectors 64, 70 allow the corresponding clamps 48, 50 and 52, 54 to pivot both upwardly and downwardly with respect to one another. The pivot connectors 66 and 68 are connected to a similar rail extending along the other side of frame 38 (not shown in FIG. 2, but illustrated schematically at 74 in FIGS. 5–11).

The contiguous ends of the clamps 50 and 52 are supported by a mechanism mounted on the rail 72 and generally indicated by the numeral 76. A similar mechanism (only a few components being shown as at 78) supports the contiguous ends of the clamps 42 and 44. The support member 78 is also illustrated schematically in FIGS. 5–11. Since the support mechanisms 76 and 78 are identical, only the support mechanism 76 will be described in detail.

Figure 3:
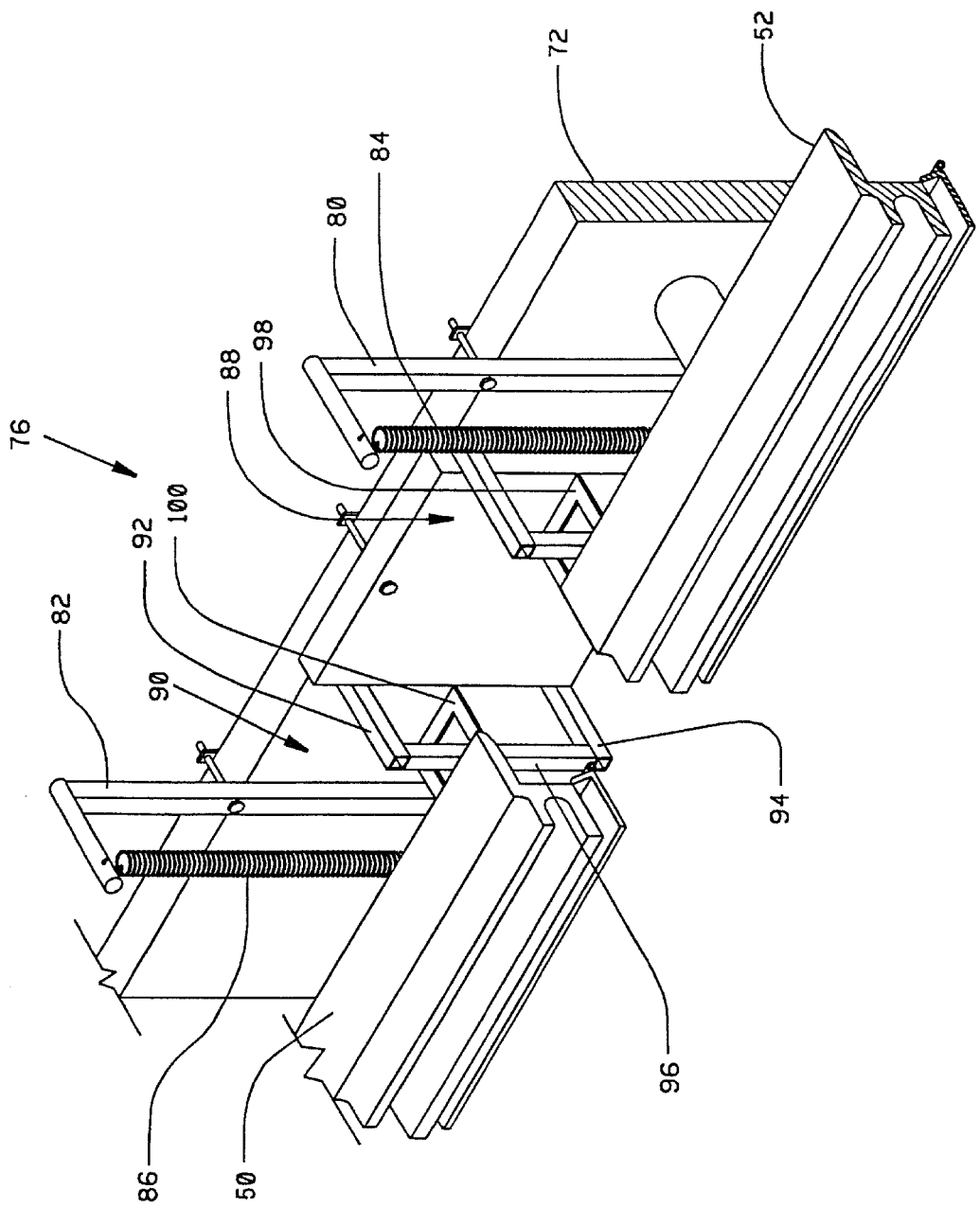
FIGS. 3 and 4 are enlargements, partly in section, of the corresponding circumscribed portions of FIG. 2.

Referring now to FIG. 3, support mechanism 76 includes a first upright 80 which is mounted on the rail 72 adjacent the end of the clamp 52 which is contiguous with the corresponding end to the clamp 50, and a second upright 82, which is mounted in a similar position adjacent the end of the clamp 50. Springs 84, 86 extend downwardly from the uprights 80, 82 and are secured to their corresponding clamps 52, 50 and are adjusted so that the contiguous ends of the clamps 50, 52 are biased to a position in which the ends are in a substantial axial alignment with one another. Brackets 88, 90 are also mounted on rail 72 adjacent the ends of the clamps 52 and 50. The brackets 88 and 90 each include an upper transverse member 92, a lower transverse member 94 and a vertical member 96 that is received within an aperture defined in a corresponding bracket 98, 100 mounted adjacent the ends of the clamp 52 and 50, respectively. Accordingly, the clamps are biased by the springs 84 and 86 into a position in which they are in substantial axial alignment, but each of the clamps 52 and 50 can move relative to one another about their correspondent pivot connections 70 and 64, the range of movement being limited by engagement of the corresponding bracket 98 or 100 with its corresponding upper and lower transverse members 92 and 94.

Figure 4:
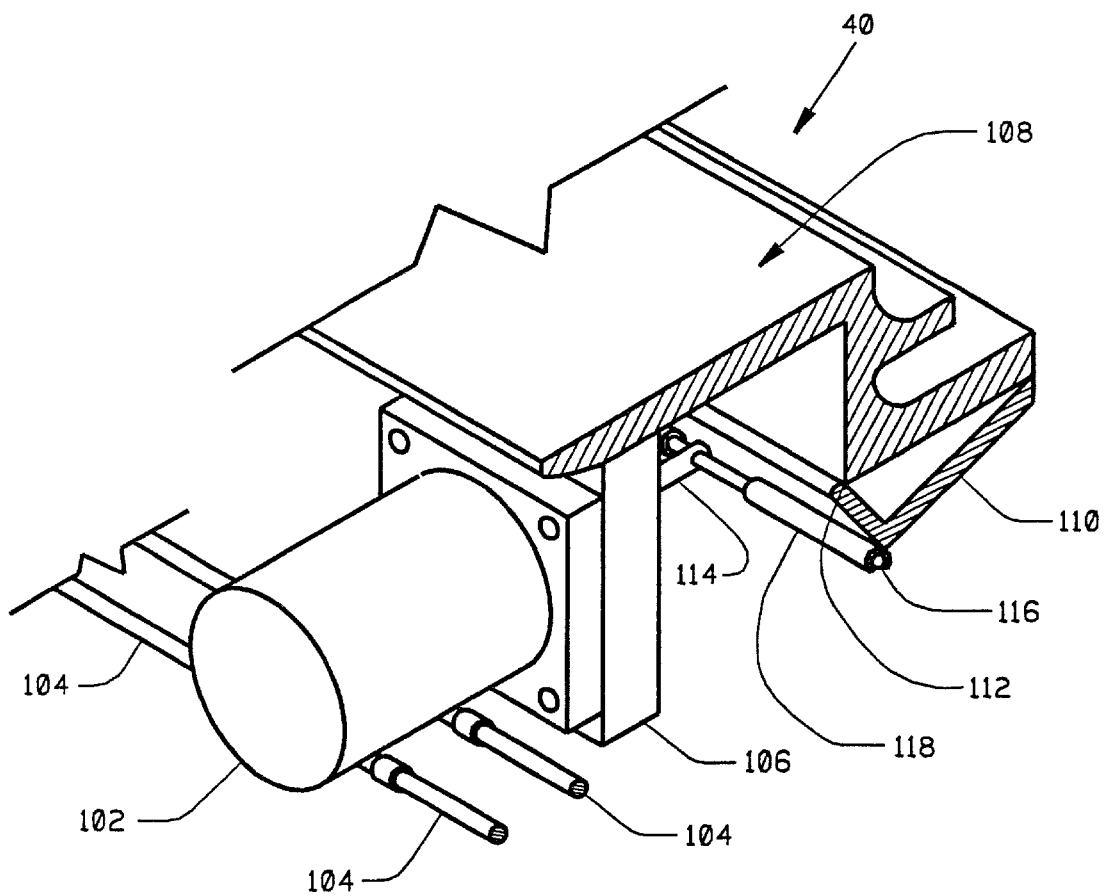

Referring to FIG. 4, each of the side clamps 40–46 and 48–54 are actuated by a pair of double acting pneumatic actuators indicated by the numeral 102, and each of the end clamps 56 and 58 are actuated by three such pneumatic actuators 102. Each of the actuators are connected with other actuators and with a supply of compressed air by flexible hoses 104. Since all of the actuators are the same, only one of the actuators 102 will be described in detail. Each of the actuators 102 are mounted on a longitudinally extending support member 106 upon which upper jaw 108 of each of the clamps 40–58 is mounted. A lower jaw 110 of each clamp is pivotally connected to the upper jaw 108 at a pivot connection 112. The actuator 102 is conventional and includes an output rod 114 which is connected to the lower jaw by a pivot connection 116 and a linkage 118. When a sheet is to be clamped in a clamping frame 38, air pressure is admitted into the actuator 102 in a direction which urges the output rod 114 in a direction biasing the lower jaw 110 to a position closing with the jaw 108. When the clamp is to be released, air is admitted into the actuators 102 in a direction which drives the output rod 114 in the reverse direction, thereby opening the lower jaw 110 from the upper jaw 108.

Referring now to FIGS. 5–11, forming takes place in a vacuum forming press having an upper platen 120 and a lower platen 122. A conventional vacuum forming die, which is illustrated in cross-section at 124, is mounted on the upper platen 120. Uprights 126, 128 extend upwardly from lower platen 122 and terminate in socket ends 130, 132 which receive the outer ends 134 (FIG. 2) of the bars 60, 62 as illustrated in FIG. 2. The ends 134 project beyond the ends of the corresponding clamps 56, 58. Preferably, two additional uprights (not shown) are located behind the uprights 126, 128. A toggle clamp 136, 138 is provided on each of the uprights and closes across the top of the corresponding socket, as will be described in detail hereinafter. The ends of the rails 72, 74 are received on tracks indicated schematically at 140, 142 which extend parallel to the end clamps 56, 58 when the clamping frame 38 is installed in the press. Accordingly, the clamping frame 38 is moveable transversely with respect to the Figures. along the tracks 140, 142.

As discussed above, when a forming operation is initiated, a conventional plastic or vinyl sheet is placed on a conventional sheet loader (not shown) and elevated onto the clamping frame 38. The clamps 40–56 are then operated to grasp the sheet and hold it in the clamping frame 38. Preferably, the aforementioned oven is offset transversely from the press, so that the frame 38 can be transferred by movement along the tracks 140, 142 from the press into the oven. The frame and sheet are heated until the sheet sags as indicated at W on FIG. 5. The frame 38 and the sheet are then moved out of the oven and back into the position illustrated in FIG. 5, wherein the sheet, still being at an elevated temperature, sags as indicated at FIG. 5. The platens 120, 122 are then advanced toward one another. As the upper platen 120 is lowered, the die 124 passes through the frame 38 and engages the sheet W. As the die 124 engages the sheet W, the clamps 42, 44 and 50, 52 are deflected slightly around the corresponding pivot connections 64, 66 and 68, 70 and the contiguous ends of the clamps 42, 44 and 50, 52 are forced downwardly, in opposition to the springs 84, 86. At the same time, lower platen 122 is raised until the sockets 130, 132 engage the ends 134, as illustrated in FIG. 6. Further upward movement of the lower platen 122 causes the uprights to pivot the side clamps 40, 48 and end clamp 58, and the side clamps 46, 54 and end clamp 56, about their corresponding pivot connections 64, 66 and 68, 70, thereby wrapping the sheet about the die 124. In the prior art, a flat, unarticulated frame was used, and the die 124 was forced into the sheet by movement of the die relative thereto. If complex shapes were formed, die locks were difficult and sometimes impossible to avoid, and substantial stretching also occurred. Usually the sheet had to be much larger than in the case of the present invention. By wrapping the sheet around the die due to the articulated clamping frame 38, the size of the sheet required for a given end product size is substantially reduced, die locks can more easily be avoided, and a better quality product results, since defects due to stretching of the material are substantially reduced. After the sheet has been wrapped around the die as indicated by FIG. 6, a conventional vacuum forming cycle begins, in which vacuum is pulled through the die 124, thereby pulling the sheet around the die, in a manner well known to those skilled in the art.

Figure 7:
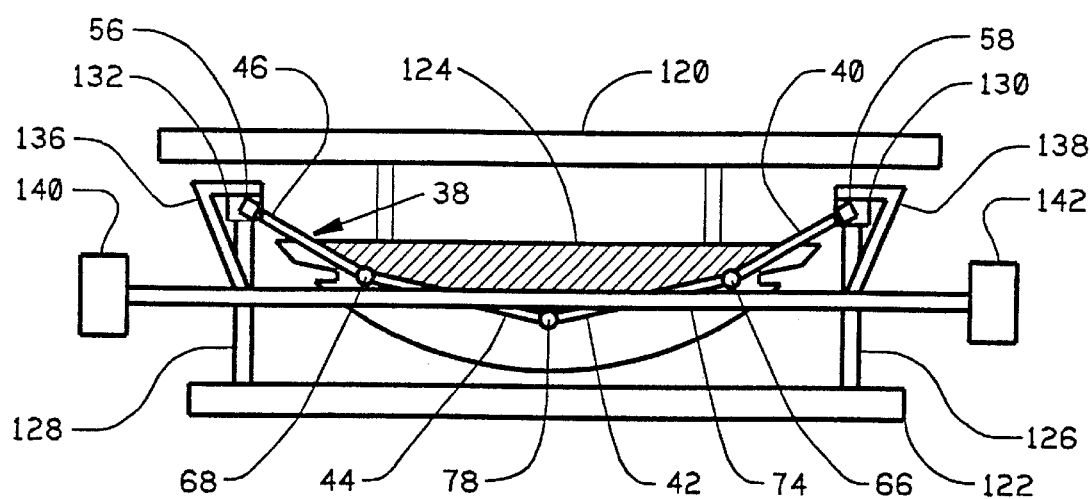
Figure 8:
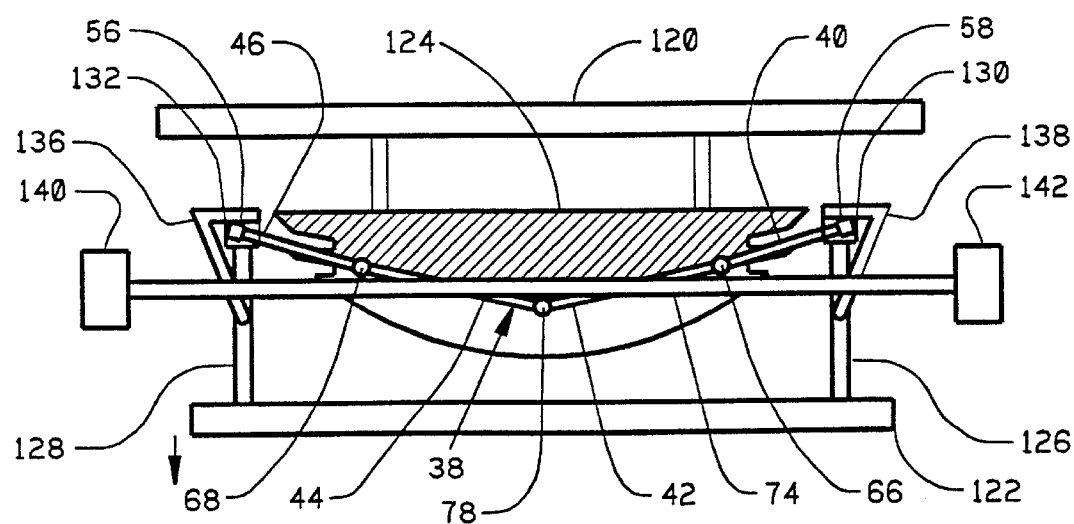
Figure 9:
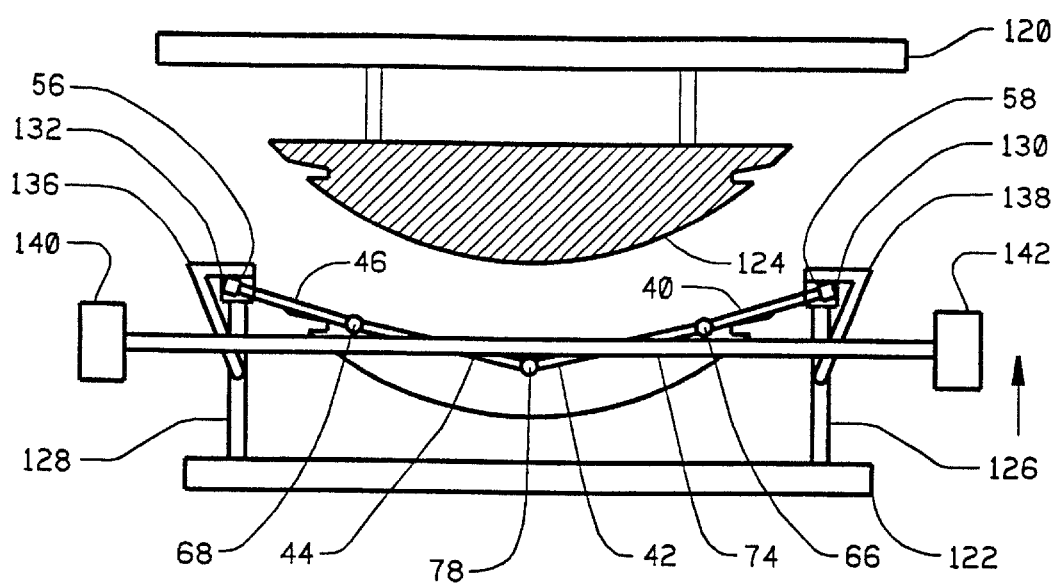
Figure 10:
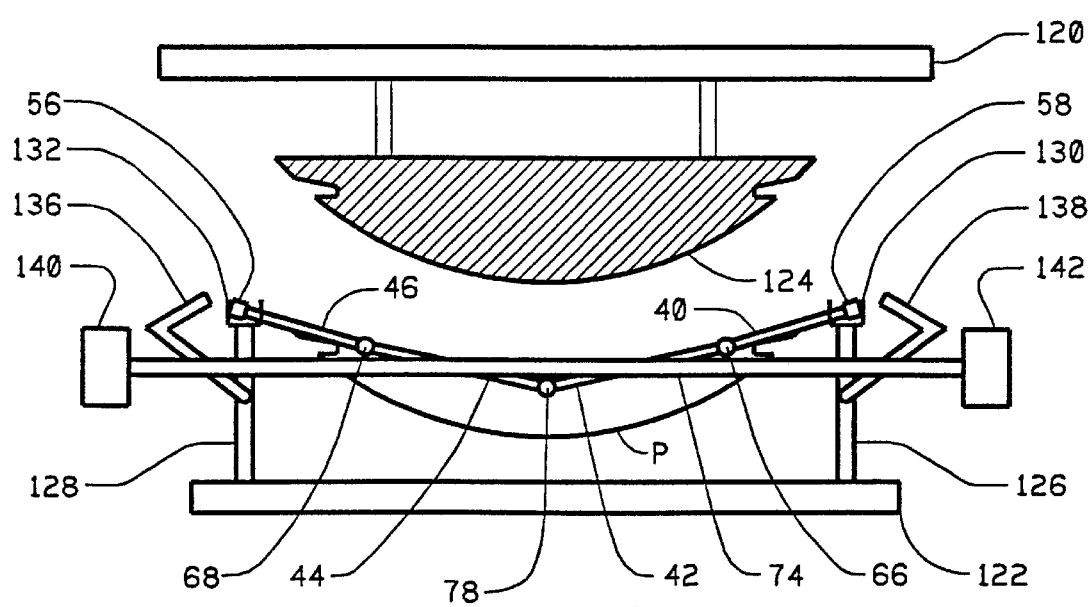
Figure 11:
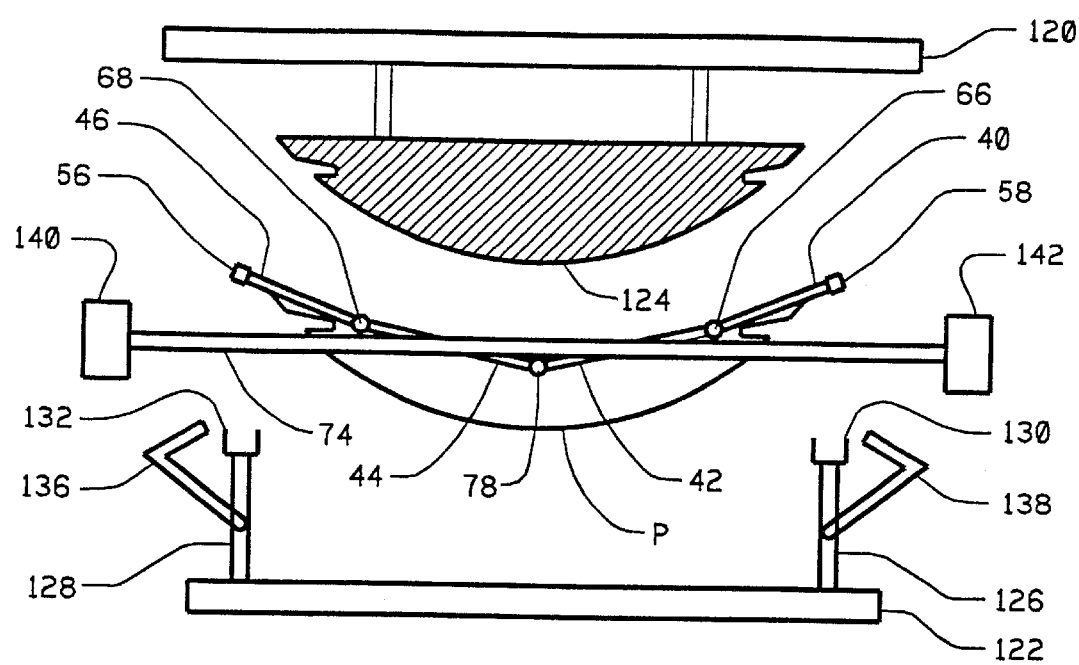

After forming is complete, a cooling cycle is initiated, such as by turning on fans, etc., to cool the sheet into a rigid state. During the vacuum forming and cooling steps, the platens remain in the positions illustrated in FIG. 6. After the product has become rigid, the toggle clamps 134, 136 are engaged over the sockets 130, 132 as illustrated in FIG. 7. The lower platen 122 is then lowered slightly, as indicated in FIG. 8, thereby breaking the product away from the die 124. The die 124 can then be extracted from the product as illustrated in FIG. 9. As also illustrated in FIG. 9, the lower platen is raised back into the FIG. 6 position to permit release of the toggle clamps, as illustrated in FIG. 10. The lower platen 122 is then lowered to the fully lowered position as illustrated in FIG. 1, while the product remains in the frame 38, which remains in the articulated position illustrated in FIG. 11. The product is then removed from the frame by positioning a conventional unloader (not shown) under the product P, and then releasing the clamps 40–58 to release the product P onto the unloader. The unloader is then able to transfer the product out of the press.

What is claimed is:

1. A press mechanism comprising:
    a clamping frame profiled to receive and clampingly retain a sheet of material to be formed, said clamping frame having articulated joints along respective sides allowing said frame to articulate about at least one axis;
    a movable die for forming an article being movable towards and away from said clamping frame; and
    movable engaging members fixed with respect to each other and profiled to hold the clamping frame adjacent end lengths thereof, said end lengths being parallel to said at least one axis, and said engaging members moving said frame with respect to said die, wherein a sheet of material to be formed by said die is held by said clamping frame and against said die.

2. The press mechanism of claim 1, further comprising:
    toggle clamps being movable from an open position permitting said engaging members to engage the clamping frame and to a closed position to hold said clamping frame adjacent said engaging members for pulling said clamping frame including said formed sheet of material away from said die.

3. The press mechanism of claim 1, wherein the engaging members are mounted to a lower platen.

4. The press mechanism of claim 1, wherein the clamping frame is removable from the press mechanism to allow the material to be heated to a forming temperature.

5. The press mechanism of claim 1 further comprising:

a side frame, said side frame including two side pieces, one piece on each of opposing sides of said clamping frame, said clamping frame being mounted to and between said side pieces, and said clamping frame being capable of articulate movement relative to said side frame.

6. The press mechanism of claim 1 wherein the frame includes a central articulation axis and at least one additional articulation axis laterally outward along said frame from said central articulation axis.

7. The press mechanism of claim 6 wherein said clamping frame is pivoted about the central articulation axis by movement of the die relative to the clamping frame, and wherein said engaging members pivot the clamping frame about said additional articulation axis.

\* \* \* \* \*

UNITED STATES PATENT AND TRADEMARK OFFICE
CERTIFICATE OF CORRECTION

PATENT NO.   : 6,474,975 B2
DATED        : November 5, 2002
INVENTOR(S)  : Ron Bibeau It is certified that error appears in the above-identified patent and that said Letters Patent is hereby corrected as shown below:

<u>Column 4,</u>
Line 58, "of" should be -- to --.

Signed and Sealed this

Thirtieth Day of September, 2003

JAMES E. ROGAN
*Director of the United States Patent and Trademark Office*